Dec. 20, 1932.       E. C. LOETSCHER       1,891,430
METHOD OF GLUING WOOD WITH PHENOL CONDENSATION PRODUCTS
Filed Aug. 22, 1931
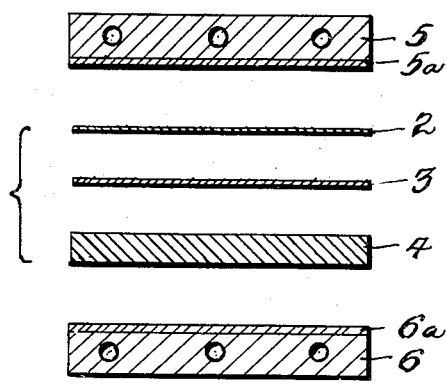
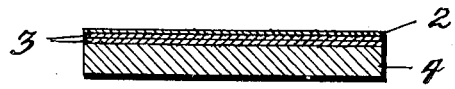

Patented Dec. 20, 1932

1,891,430

UNITED STATES PATENT OFFICE

EMIL C. LOETSCHER, OF DUBUQUE, IOWA

METHOD OF GLUING WOOD WITH PHENOL CONDENSATION PRODUCTS

Application filed August 22, 1931. Serial No. 558,835.

The object of the invention is to provide an improved method of gluing wood and the like, and particularly veneered products, by placing between the layers or pieces to be united one or more sheets of material previously impregnated with a phenol condensation product and then compacting the assembly between steam heated platens of a hydraulic press to react the phenol condensation product. Reference will be had to the accompanying drawing wherein, Fig. 1 is a diagrammatical sectional view of the parts of the product juxtaposed for assembly in a press, and Fig. 2 is a vertical sectional view of a product of the invention. In the drawing, reference numeral 2 designates a layer of wood veneer, 3 one or more layers of impregnated paper or the like, 4 a base layer of wood or the like, 5 and 6 upper and lower steam-heated water-cooled platens respectively, and 5a and 6a plain or irregularly shaped pressure plates therefor respectively.

In practising the invention, a sheet of paper, preferably non-sized kraft paper of about 50 to 75 pounds basic weight, is run through a bath of phenol condensation product which has been diluted to a suitable consistency with alcohol or other well known solvent. The impregnated paper sheet is then placed in a suitable enclosure and subjected to a temperature of about 130° C. for approximately three or four minutes to partially expel the solvent (approximately 85% to 90%) from the phenol condensation product. The latter is not dried to the same extent as commonly practised in making laminated products, but is left in a very plastic and reactive condition so that when the impregnated paper is placed between layers or parts of wood to be united and the heat is applied, the solvent will have a plasticizing effect on the phenol condensation product, and will cause the latter to penetrate the pores of the wood, thereby gaining firm adhesion.

In certain work, one or more layers of paper are desirable as padding between the veneer and the base or core, but when the phenol condensation product with which the same is impregnated is dried to the usual high extent, in addition to not providing the desired degree of adhesion, it further renders the paper itself insufficiently plastic to accommodate itself to irregularities between the surfaces of the pieces to be united. The paper padding must be sufficiently plastic to be compressed at certain points while at others, it must virtually flow or crowd together to fill pockets between the pieces, particularly in the case where veneer is caused to perfectly follow the contour of a die rather than that of the base or core material, and this condition is obtained by leaving the phenol condensation product and paper in a plastic condition in accordance with this invention.

Even where padding is not necessary, a sheet of paper coated or impregnated with phenol condensation product, being very convenient to handle, affords a very much more expeditious means of applying the condensation product between the pieces or layers to be united than direct coating of the latter, because in the latter case it is necessary to dry the condensation product before the pressure is applied, and such coating causes the wood to curl and warp very badly making it inconvenient to handle the same and causing considerable loss through mishandling.

Impregnated or coated sheets of paper have previously been used as a carrier for phenol condensation products, as in making up all paper laminated products, but in such cases the drying of the saturated sheets, prior to assembly, has been carried out to a very high point, driving out most of the solvent from the condensation product, this being necessary so that when the sheets of paper are compressed at the essentially high pressure of 1500 or 2500 pounds per square inch, the condensation product would not become too plastic and flow too freely to cause the paper to become so plastic as to tear or undesirably distort. Pressures as high as 1500 or 2500 pounds per square inch are entirely unsuitable in the manufacture of most wood products, particularly veneered or laminated panels, because the wood would be crushed to a very dense structure and in many cases would split or rupture on account of the great deformation. Under the present invention, pressures as low as 150 to 200 pounds per square inch may be used and still produce very satisfactory adhesion.

After the sheet 3 of paper has been prepared as designated, one or more thereof is/are placed between the wood pieces or layers 2 and 4 to be united and the assembly placed in a hydraulic press, having steam heated and water-cooled platens 5 and 6, and if desired, suitable pressure plates 5a and 6a, plain or irregular, may be used between the press platen and outer layer or piece of wood. These platens may be separate pieces or parts of the press platens and where the term platen is used, it is intended to cover either the press platen proper or the facing plate thereof. Under pressure, the wood layer or pieces and the impregnated paper are compacted into intimate relation and the applied heat first causes the phenol condensation product to fuse and flow into the pores of the wood pieces or layers and then reacts the condensation product causing the same to harden and become insoluble and infusible. This makes a very high grade product which is entirely water proof, being capable of being boiled in water for many hours without deterioration. It also stands a high humidity test indefinitely and will stand upwards of 300° F. without the adhesive being deteriorated, rendering it immune from deleterious effects of humidity and temperature ordinarily encountered in dwellings.

The product is not affected with growth of fungi in the cementing layer, so commonly the case when casein glue is used, nor does the cementing layer suffer the same deterioration as when hide glue is used since hide glue under low humidity or dry atmosphere loses its adhesive qualities and becomes brittle.

The condensation product known as bakelite and which is soluble in alcohol and other relatively expensive solvents, may be employed, but a cheaper and equally satisfactory adhesive is a phenol formaldehyde carbohydrate condensation product which is soluble in water.

While paper has been specifically recited as the sheet material 3, yet fabric, whether a textile, felt, or batting, may be substituted to advantage in certain work, though generally paper is the preferred sheet material used.

The low pressures employed herein are particularly advantageous in making veneered products where very thin layers 2 of veneer (as 1/100" in thickness) are applied, since at this pressure not only the wood base or core is not crushed but the thin veneer is also not crushed, and moreover because of the plasticity of the underlying paper and condensation product, the thin veneer will show no tendency to rupture.

Having thus described my invention, what I claim as new and desire to secure by Letters Patent is:

1. The method of veneering a base, consisting in treating a fibrous sheet with a synthetic resin rendered plastic by a solvent, drying out the treated sheet to remove approximately from 85 to 90 per cent of the solvent, then placing the sheet between a base and a layer of wood veneer approximately 1/100 inch thick and subjecting the pack to heat to react the synthetic resin and also subjecting the pack to pressure sufficiently lower than 1,500 pounds per square inch as not to injure the veneer.

2. The method of veneering a base, consisting in treating a fibrous sheet with a synthetic resin rendered plastic by a solvent, drying out the treated sheet to remove from 85 to 90 per cent of the amount of solvent usually expelled, then placing the sheet between a base and a layer of paper-thin wood veneer, and subjecting the pack to heat to react the synthetic resin and also to pressure considerably lower than would be required for sheets treated with synthetic resin from which the usual amount of solvent has been expelled.

3. The method of veneering a base, consisting in treating a fibrous sheet with a water soluble phenol formaldehyde carbohydrate condensation product rendered plastic by its solvent, drying out the treated sheet to remove approximately from 85 to 90 per cent of the solvent, then placing the sheet between a base and a layer of wood veneer approximately 1/100 inch thick, and subjecting the pack to heat to react the condensation product and also subjecting the pack to pressure sufficiently less than 1,500 pounds per square inch as not to injure the veneer.

In testimony whereof I affix my signature.

EMIL C. LOETSCHER.